(12) United States Patent
Wu

(10) Patent No.: US 8,767,607 B2
(45) Date of Patent: Jul. 1, 2014

(54) METHOD AND APPARATUS FOR PERFORMING MULTICAST IN COMMUNICATIONS NETWORK

(75) Inventor: Zong Liang Wu, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 821 days.

(21) Appl. No.: 12/819,106

(22) Filed: Jun. 18, 2010

(65) Prior Publication Data
US 2010/0322134 A1    Dec. 23, 2010

Related U.S. Application Data

(60) Provisional application No. 61/218,348, filed on Jun. 18, 2009.

(51) Int. Cl.
H04H 20/71 (2008.01)
H04L 12/28 (2006.01)
H04L 12/56 (2006.01)

(52) U.S. Cl.
USPC .......................................... 370/312; 370/390

(58) Field of Classification Search
None
See application file for complete search history.

(56) References Cited

U.S. PATENT DOCUMENTS

| | | | |
|---|---|---|---|
| 2003/0022683 A1* | 1/2003 | Beckmann et al. | 455/518 |
| 2003/0081547 A1* | 5/2003 | Ho | 370/229 |
| 2006/0045036 A1* | 3/2006 | Isobe et al. | 370/312 |
| 2006/0083253 A1* | 4/2006 | Park et al. | 370/401 |
| 2006/0092868 A1* | 5/2006 | Meier | 370/312 |
| 2007/0058628 A1* | 3/2007 | Palnati et al. | 370/390 |
| 2007/0211631 A1* | 9/2007 | Rahman et al. | 370/230 |
| 2007/0217436 A1* | 9/2007 | Markley et al. | 370/401 |
| 2008/0155612 A1* | 6/2008 | Ikeda et al. | 725/87 |
| 2008/0168507 A1* | 7/2008 | Teramoto et al. | 725/74 |
| 2008/0181161 A1* | 7/2008 | Gi Kim et al. | 370/312 |
| 2008/0216143 A1* | 9/2008 | Ikeda et al. | 725/116 |
| 2008/0298241 A1* | 12/2008 | Ohana et al. | 370/235 |
| 2009/0010263 A1* | 1/2009 | Ma et al. | 370/395.4 |
| 2009/0086731 A1* | 4/2009 | Lee et al. | 370/389 |
| 2009/0100490 A1* | 4/2009 | Nandhakumar | 725/114 |
| 2009/0106801 A1* | 4/2009 | Horii | 725/91 |
| 2009/0187939 A1* | 7/2009 | Lajoie | 725/34 |
| 2009/0285212 A1* | 11/2009 | Chu et al. | 370/390 |
| 2010/0031297 A1* | 2/2010 | Klein et al. | 725/78 |
| 2010/0118758 A1* | 5/2010 | Brandt et al. | 370/312 |
| 2010/0158021 A1* | 6/2010 | Kliger et al. | 370/400 |
| 2010/0158022 A1* | 6/2010 | Kliger et al. | 370/400 |
| 2010/0246586 A1* | 9/2010 | Ohana et al. | 370/400 |
| 2010/0316050 A1* | 12/2010 | Baykal et al. | 370/390 |
| 2011/0013633 A1* | 1/2011 | Klein et al. | 370/390 |
| 2011/0205891 A1* | 8/2011 | Kliger et al. | 370/230 |
| 2011/0310907 A1* | 12/2011 | Klein et al. | 370/401 |
| 2013/0039186 A1* | 2/2013 | Ohana et al. | 370/235 |

* cited by examiner

*Primary Examiner* — Chirag Shah
*Assistant Examiner* — Suk Jin Kang
(74) *Attorney, Agent, or Firm* — Bruce Greenhaus; Sheppard Mullin Richter & Hampton LLP

(57) ABSTRACT

When one node has information to transmit to a group of nodes using a parameterized quality of service (PQoS) transmission, a broadcast flow is created rather than creating a multicast flow, which is not available. While the flow is created as a broadcast flow, if the flow is to be directed to less than all of the nodes on the network, then the flow will be considered a Multicast PQoS flow. The broadcast flow is created using a process that is known as a "PQoS Create Flow" transaction.

7 Claims, 25 Drawing Sheets

Interaction between Higher layer and MoCA layer for multicast management for non-Parameterized QoS traffic At the end of the MoCA Multicast Channel Create/Update Transaction, all nodes involved in a multicast know the association between the Multicast MAC address and the Multicast Channel ID.

L2ME_PAYLOAD Field for Submit L2ME Frame for Multicast Channel Create and Update Transactions

| Field | Length | Usage |
|---|---|---|
| Submit L2ME Payload for Create and Update Multicast Channel | | |
| INGRESS_NODE_ID | 8 bits | Node ID for the ingress node of the multicast channel |
| MCAST_CHANNEL_ID | 8 bits | For Create: Reserved; For Update: Multicast Channel ID |
| MCAST_MAC_DA | 48 bits | Multicast MAC address of the multicast channel |
| RESERVED | 32 bits | reserved |

FIGURE 2

Request L2ME Frame Format

| Field | Length | Usage |
|---|---|---|
| \multicolumn{3}{c}{L2ME Request Header} | | |
| HDR_FMT | 8 bits | 0x9 |
| ENTRY_NODE_ID | 8 bits | The ID of the Entry node that submitted the transaction; 0xFF = no Entry node (i.e., the Transaction was initiated by the NC node). |
| ENTRY_INDEX | 8 bits | Copied from the initiating Submit message; 0 = no Entry node |
| WAVE_SEQ_N | 8 bits | An NC counter, which is held constant for all the L2ME Wave Cycles in an L2ME Wave, and is incremented when a new L2ME Wave starts. The NC node MUST increment this counter without resetting from the last L2ME Wave in an L2ME Transaction to the first L2ME Wave in the next L2ME Transaction in the network. |
| VENDOR_ID | 16 bits | Copied from initiating Submit or NC node specified if ENTRY_NODE_ID=0xFF |
| TRANS_TYPE | 8 bits | Copied from initiating Submit or NC node specified if ENTRY_NODE_ID=0xFF |
| TRANS_SUBTYPE | 8 bits | Copied from initiating Submit or NC node specified if ENTRY_NODE_ID=0xFF |
| WAVE_NODEMASK | 32 bits | If TXN_WAVE_N=0<br>    If there is an Entry node, copied from initiating Submit field WAVE0_NODEMASK; otherwise as desired by the NC<br>If (TXN_WAVE_N ≠ 0) |
| CYCLE_NODEMASK | 32 bits | The subset of WAVE_NODEMASK where the NC node requires a Response in this Wave Cycle |
| WAVE_STATUS | 8 bits | Bits 7:3 reserved Type III as defined in [1]<br>Bit 2: RESP_FAIL = 1 if response was not received from the requested node in previous Wave. This indicates that this is the last L2ME Wave due to transaction failure; otherwise = 0<br>Bit 1: 0x0 reserved Type III as defined in [1]<br>Bit 0: FINAL_SUCCESS = 1 if the NC node declares this Wave as the last Wave with no errors; otherwise = 0 |
| DIR_LEN | 8 bits | 0x10 - If L2ME_PAYLOAD field has payload type "Concatenated", otherwise 0x0. |
| TXN_SEQ_N | 8 bits | A transaction sequence number, which is held constant for all the L2ME Waves in an L2ME transaction, and is incremented by the NC node when a new L2ME transaction starts |
| TXN_WAVE_N | 8 bits | Wave number within the L2ME transaction, starting with 0 for initial Wave, and incremented by 1 for each subsequent Wave, except for the situation wherein the TXN_WAVE_N entry is set to TXN_LAST_WAVE_NUM. |
| \multicolumn{3}{c}{L2ME Payload} | | |
| L2ME_PAYLOAD | Variable length | Copied from the Submit message payload |

FIGURE 3

L2ME_PAYLOAD for Response L2ME Frame for Create/Update Multicast Channel Transactions (Wave 0)

| Field | Length | Usage |
|---|---|---|
| HDR_FMT | 8 bits | 0xA |
| RESP_STATUS | 8 bits | Bits 7:4 – reserved<br>Bit 3: DO_ENTRY_CANCEL = '1' iff the Entry node requires during Wave 0 that the NC node not to issue any further Waves in the transaction<br>Bit 2: IN_NEXT_WAVE = '1' iff the node MUST be included in WAVE_NODEMASK in the next Wave<br>Bit 1: 0x0 reserved<br>Bit 0: INTERPRETED = 1 iff the node Recognized the Request message |
| RESERVED | 8 bits | |
| WAVE_SEQ_N | 8 bits | Copied from initiating Request |
| RESERVED | 32 bits | |
| Response L2ME Payload for Create Flow/Update Flow | | |
| RESERVED | 8 bits | Type III as defined in [1] |
| RESPONSE_CODE | 8 bits | As defined in table of FIGURE 5 |
| MCAST_CHANNEL_ID | 8 bits | For Ingress node: Assigned MCAST Channel ID<br>For all other nodes: reserved |
| MCAST_MAC_DA | 48 bits | For Ingress node: Multicast MAC address<br>For all other nodes: reserved |
| RESERVED | 8 bits | Type III as defined in [1] |

FIGURE 4

List of RESPONSE_CODE values

| RESPONSE CODE NAME | Value | Description |
|---|---|---|
| RESPONSE_CODE_INGRESS | 0x1 | This code is selected by the ingress node for both Create and Update Multicast Channel Transaction if the node approves the Create/ Update request; All other nodes do not use this response code |
| RESPONSE_CODE_EGRESS | 0x2 | If the responding node is an egress node for the Multicast Channel, then the node selects this code for both Create and Update Multicast Channel Flow transaction if The node approves and acknowledges the Create/ Update request; or All other nodes do not use this response code |
| RESPONSE_CODE_TOO_MANY_MCAST_CHANNELS | 0xD | This code are not selected during Update Flow Transaction. This code is not selected by nodes that are not ingress nor egress for the specified multicast channel. |
| RESPONSE_CODE_UNINVOLVED | 0xB | A node that is not the ingress node or an egress node for the Multicast Channel selects this code to inform the NC that it does not care about this Multicast Channel. Ingress or egress nodes for the requested Multicast Channel does not use this response code |
| All RESPONSE_CODE values not listed in this table are Reserved for Future Use. | | |

FIGURE 5

L2ME_PAYLOAD of Request L2ME Frame for Create and Update Multicast Channel Transactions (Wave 1)

| Field | Length | Usage |
|---|---|---|
| Request L2ME Payload for Create Flow/Update Multicast Channel | | |
| DECISION | 8 bits | Decision values as defined in FIGURE 7 |
| MCAST_CHANNEL_ID | 8 bits | For Ingress node: Assigned MCAST Channel ID<br>For all other nodes: reserved |
| MCAST_MAC_DA | 48 bits | For Ingress node: Multicast MAC address<br>For all other nodes: reserved |

FIGURE 6

List of acceptable DECISION values

| DECISION NAME | Value | Description |
|---|---|---|
| DECISION_SUCCESS | 0x1 | Create or Update Multicast Channel request is granted |
| DECISION_TOO_MANY_MCAST_CHANNELS | 0xD | Ingress or egress nodes are unable to create the Multicast Channel |
| DECISION_MCAST_CHANNEL_NOT_FOUND | 0xE | This value is not used during Create Multicast Channel Transaction. During Update Multicast Channel Transaction, this code indicates that the requested MCAST_CHANNEL_ID does not match MCAST_CHANNEL_ID of any Multicast Channel in the MoCA Network, |
| All DECISION values not listed in this table are Reserved for Future Use. | | |

FIGURE 7

L2ME_PAYLOAD of Submit L2ME Frame for Delete Multicast Channel Transaction

| Field | Length | Usage |
|---|---|---|
| Submit L2ME Payload for Delete Flow | | |
| MCAST_CHANNEL_ID | 8 bits | Multicast Channel ID to be deleted |
| RESERVED | 16 bits | Type III as defined in [1] |
| RESERVED | 32 bits | Type III as defined in [1] |

FIGURE 8

Response L2ME Frame Format for Delete Multicast Channel Transaction (Wave 1)

| Field | Length | Usage |
|---|---|---|
| Response L2ME Payload Delete Flow (Wave 1) | | |
| DELETED | 32 bit | Bit 31 - 1 if the node had resources corresponding to the Multicast Channel ID<br>Bits 30:0 – reserved Type III |

FIGURE 9

Response L2ME Frame Format for Delete PQoS Flow Transaction (Wave 2)

| Field | Length | Usage |
|---|---|---|
| L2ME Response Payload for Delete Multicast Channel (Wave 2) | | |
| RESERVED | 32 bit | Type III as defined in [1] |

FIGURE 10

**L2ME_PAYLOAD of Submit L2ME Frame Format for
Query Multicast Channel Transaction**

| Field | Length | Usage |
|---|---|---|
| Submit L2ME Payload for Query PQoS Flow | | |
| RESERVED | 32 bits | Type III as defined in [1] |
| MCAST_MAC_DA | 48 bits | The MCAST MAC Address being queried for |
| RESERVED | 16 bits | Type III as defined in [1] |

FIGURE 11

Response L2ME Frame format for Query Multicast Channel Transaction (Wave 0) if the Multicast Channel is found

| Field | Length | Usage |
|---|---|---|
| Response L2ME Payload for Query PQoS Flow | | |
| MCAST_MAC_DA | 48 bits | The Multicast MAC Address of the channel being queried |
| | | |
| INGRESS_NODE_ID | 8 bits | Node ID for the ingress of the Multicast Channel |
| EGRESS_NODE_ID | 8 bits | The Multicast Channel ID of the Multicast Channel |
| | | |
| | | |
| | | |
| | | |

FIGURE 12

L2ME_PAYLOAD Field for Submit L2ME Frame for Create and Update PQoS Flow Transactions

| Field | Length | Usage |
|---|---|---|
| \multicolumn{3}{c}{Submit L2ME Payload for Create PQoS Flow and Update PQoS Flow} | | |
| FLOW_ID | 48 bits | Unique identification number of the PQoS Flow |
| | | |
| | | |
| INGRESS_NODE_ID | 8 bits | If TRANS_SUBTYPE =1, Node ID for the ingress node of the PQoS Flow, otherwise Type II reserved |
| | | |
| EGRESS_NODE_ID | 8 bits | If TRANS_SUBTYPE =1, Node ID of the egress node of a Point-to-Point PQoS Flow; 0x3F for a Broadcast PQoS Flow; 0x00 for a Multicast PQoS Flow Create; For Update the actual Multicast Channel ID for other TRANS_SUBTYPE values, Type II reserved |
| FLOW_TAG1 | 8 bits | A unique identifier that, together with the ingress node's node ID, uniquely identifies a unicast or broadcast PQoS flow. |
| FLOW_TAG2 | 24 bits | Application specific content |
| PACKET_DA | 48 bits | DA of Ethernet packets of the PQoS Flow This is the Multicast MAC Address for a Multicast PQoS flow |
| | | |
| | | |
| | | |
| | | |
| | | |

FIGURE 13

L2ME_PAYLOAD for Response L2ME Frame for Create PQoS Flow and Update Flow Transactions (Wave 0)

| Field | Length | Usage |
|---|---|---|
| Response L2ME Payload for Create Flow/Update Flow | | |
| RESERVED | 8 bits | Type III as defined in [1] |
| RESPONSE_CODE | 8 bits | As defined in Error! Reference source not found. 5 |
| RESERVED | 8 bits | Type III as defined in [1] |
|  |  |  |
|  |  |  |
|  |  |  |
|  |  |  |
|  |  |  |
| MCAST_CHANNEL_ID | 8 bits | Ingress node: MCAST channel ID assigned by the ingress node<br>For all other nodes: reserved |
| MCAST_MAC_DA | 48 bits | Ingress node: Multicast MAC Address<br>For all other nodes: reserved |

FIGURE 15

List of RESPONSE_CODE values

| RESPONSE CODE NAME | Value | Description |
|---|---|---|
| RESPONSE_CODE_ INGRESS | 0x1 | This code is selected by the ingress node for both Create and Update PQoS Flow Transaction if:<br>1. The node approves the Create/ Update request; or<br>2. The node rejects the Create/Update request for bandwidth-related reason and provides a value in REM_NODE_CAPACITY field lower than the requested T_PEAK_DATA_RATE<br>All other nodes do not use this response code |
| RESPONSE_CODE_ EGRESS | 0x2 | If the responding node is an egress node for the PQoS Flow, then the node selects this code for both Create and Update PQoS Flow transaction if:<br>1. The node approves the Create/ Update request; or<br>2. The node rejects the Create/Update request for a bandwidth-related reason and provides a value in REM_NODE_CAPACITY field lower than the requested T_PEAK_DATA_RATE<br>All other nodes do not use this response code |
| RESPONSE_CODE_ TOO_MANY_ MCAST_CHANNELS | 0xD | This code is not selected during Update Flow Transaction.<br>This code is not selected by nodes that are not ingress or egress for the specified multicast channel. |
| RESPONSE_CODE_ FLOW_EXISTS | 0x3 | This code is not selected for Update Flow Transaction. For Create Flow Transaction, this code is selected by any node that currently has PQoS Flow resources allocated to a PQoS Flow with this FLOW_ID. |
| RESPONSE_CODE_ TOO_MANY_FLOWS | 0x6 | This code is not selected during Update Flow Transaction.<br>This code is not selected by nodes that are not ingress or egress for the specified flow. An egress node of the requested PQoS Flow does not select this code unless it is already the egress for at least N31 other PQoS Flows. The ingress node of the requested PQoS Flow does not select this code unless it is already the ingress node for at least N30 other PQoS Flows. |
| RESPONSE_CODE_ INVALID_DA | 0x7 | The DA of the requested PQoS Flow is a unicast Ethernet address and the node does not support this feature. |
| RESPONSE_CODE_ INVALID_TSPEC | 0x8 | The ingress node of the requested PQoS Flow selects this code if<br>1. requested T_PACKET_SIZE value is < 64 B or > 1518 B,<br>2. Egress node is the same as Ingress node ID 3. burst size (T_BURST_SIZE) is less than 1 and/or greater than 9.<br>Other nodes MAY also select this code if requested T_PACKET_SIZE value is < 64 B or > 1518 B. |
| RESPONSE_CODE_ LEASE_EXPIRED | 0xA | This code is not selected by any node during Create PQoS Flow Transaction.<br>This code is selected by the ingress node or the egress node of the PQoS Flow if the Update PQoS Flow Transaction is attempting to alter a PQoS Flow for which resources will be deleted within T37 due to lease expiration. |
| RESPONSE_CODE_ UNINVOLVED | 0xB | A node that is not the ingress node or an egress node for the PQoS Flow either selects this code to accept the Create or Update Flow request or selects another appropriate code in this Table to reject the Create or Update Flow request.<br>Ingress or egress nodes for the requested PQoS Flow does not use this response code |
| All RESPONSE_CODE values not listed in this table are Reserved for Future Use. | | |

FIGURE 16

L2ME_PAYLOAD of Request L2ME Frame for Create and Update
PQoS Flow Transactions (Wave 1)

| Field | Length | Usage |
|---|---|---|
| Request L2ME Payload for Create Flow/Update PQoS Flow ||| 
| DECISION | 8 bits | Decision values as defined in Error! Reference source not found. |
| BW_LIMIT_INFO | 8 bits | If DECISION is 0x4, 0x5, 0x11 or 0x12,<br><br>Bits 7:4 – Reserved Type III<br>Bits 3:0 – see text below Error! Reference source not found..<br><br>Otherwise, Type II Reserved<br><br>Note that the NC node sets each applicable bit to '1' independent of the other bits. |
| MAX_BURST_SIZE | 8 bits | The smallest value of the REM_BURST_SIZE reported by any egress node in Wave 0 of the Create or Update PQoS Flow Transaction. The value may be useful to a higher layer application at the Entry node to re-submit a Create/ Update request with modified TSPEC parameters. |
| RESERVED | 8 bits | Type III as defined in [1] |
| MAX_PEAK_DATA_RATE | 32 bits | If DECISION is 0x4, 0x5, 0x11 or 0x12, maximum allowable PQoS Flow peak data rate (bits/second) for assured successful create or update this PQoS Flow; otherwise ignore (reserved Type II) |
| POST_STPS | 32 bits | For Update Flow Transaction, if the DECISION is DECISION_SUCCESS, then this field contains total number of SLOT_TIMES/second allocated to all PQoS Flows after the decision; otherwise Type II Reserved.<br>For Create Flow Transaction, this field always contains total number of SLOT_TIMES/second allocated to all PQoS Flows after the decision regarding Flow creation (regardless of the value of DECISION field). The total includes SLOT_TIMES/second for the newly created Flow, if DECISION is DECISION_SUCCESS. |
| POST_TXPS | 32 bits | For Update Flow Transaction, if the DECISION is DECISION_SUCCESS, then this field contains total number of Flow transmissions/second allocated to all PQoS Flows after the decision; otherwise Type II Reserved.<br>For Create Flow Transaction, this field always contains total number of Flow transmissions/second allocated to all PQoS Flows after the decision regarding Flow creation (regardless of the value of DECISION field). The total includes Flow Transmissions/second for the newly created Flow, if DECISION is DECISION_SUCCESS. |
| MCAST_CHANNEL_ID | 8 bits | For Ingress node: Assigned MCAST Channel ID<br>For all other nodes: reserved |
| MCAST_MAC_DA | 48 bits | For Ingress node: Multicast MAC address<br>For all other nodes: reserved |

FIG. 17

List of acceptable DECISION values

| DECISION NAME | Value | Description |
|---|---|---|
| DECISION_SUCCESS | 0x1 | Create or Update Flow request is granted |
| DECISION_FLOW_EXISTS | 0x3 | Create Flow request rejected due to a node already acting as ingress for the specified PQoS Flow |
| DECISION_INSUF_INGR_BW | 0x4 | PQoS Flow cannot be created or updated due to insufficient bandwidth on Ingress Node data path; NC provides the maximum feasible PQoS Flow bandwidth |
| DECISION_INSUF_EGR_BW | 0x5 | PQoS Flow cannot be created or updated due to insufficient bandwidth on Egress Node data path; NC provides the maximum feasible PQoS Flow bandwidth |
| DECISION_TOO_MANY_FLOWS | 0x6 | Ingress or Egress nodes are unable to create the PQoS Flow |
| DECISION_INVALID_TSPEC | 0x8 | Node can't accept the received TSPEC value |
| DECISION_INVALID_DA | 0x9 | The requested PACKET_DA is unicast (only for Create PQoS Flow Transaction) |
| DECISION_LEASE_EXPIRED | 0Xa | Update operation failed due to the PQoS Flow being deleted from the MoCA Network |
| DECISION_INVALID_BURST_SIZE | 0xB | Create or Update operation failed because the requested burst size T_BURST_SIZE is less than REM_BURST_SIZE for at least one of the Wave 0 Responses in this Transaction. |
| DECISION_TOO_MANY_MCAST_CHANNELS | 0xD | Ingress or Egress nodes are unable to create the Multicast PQoS flow |
| DECISION_MCAST_CHANNEL_NOT_FOUND | 0xE | This value is not used during Create Multicast PQoS Flow Transaction.<br>During Update Multicast PQoS Flow Transaction, this code indicates that the requested MCAST_CHANNEL_ID does not match MCAST_CHANNEL_ID of any Multicast Channel in the MoCA Network, |
| DECISION_FLOW_NOT_FOUND | 0x10 | This value is not used during Create PQoS Flow Transaction.<br>During Update PQoS Flow Transaction, this code indicates that the requested FLOW_ID does not match FLOW_ID of any PQoS Flow in the MoCA Network, |
| DECISION_INSUF_AGGR_STPS | 0x11 | Insufficient aggregated SLOT_TIMES/second on the MoCA Network |
| DECISION_INSUF_AGGR_TXPS | 0x12 | Insufficient PQoS Flow transmissions/second on the MoCA Network |
| All DECISION values not listed in this table are Reserved for Future Use. | | |

FIG. 18

Non-bandwidth-related RESPONSE_CODEs and corresponding DECISION values

| RESPONSE CODE NAME | Non-Bandwidth DECISION NAME |
|---|---|
| RESPONSE_CODE_FLOW_EXISTS | DECISION_FLOW_EXISTS |
| RESPONSE_CODE_TOO_MANY_FLOWS | DECISION_TOO_MANY_FLOWS |
| RESPONSE_CODE_INVALID_TSPEC | DECISION _INVALID_TSPEC |
| RESPONSE_CODE_INVALID_DA | DECISION_INVALID_DA |
| RESPONSE_CODE_LEASE_EXPIRED | DECISION_LEASE_EXPIRED |
| RESPONSE_CODE_TOO_MANY_MCAST_CHANNELS | DECISION_TOO_MANY_MCAST_CHANNELS |

FIGURE 19

L2ME_PAYLOAD of Submit L2ME Frame Format for Query PQoS Flow Transaction

| Field | Length | Usage |
|---|---|---|
| Submit L2ME Payload for Query PQoS Flow | | |
| RESERVED | 32 bits | Type III as defined in [1] |
| FLOW_ID | 48 bits | Unique identification number of the PQoS Flow being queried for |
| RESERVED | 16 bits | Type III as defined in [1] |

FIGURE 20

**Response L2ME Frame format for Query PQoS Flow Transaction
(Wave 0) if the Flow is found**

| Field | Length | Usage |
|---|---|---|
| Response L2ME Payload for Query PQoS Flow | | |
| LEASE_TIME_LEFT | 32 bits | Remaining PQoS Flow lease time; 0xFFFFFFFF if no lease expiration time |
| FLOW_ID | 48 bits | FLOW_ID of the queried PQoS Flow |
| RESERVED | 16 bits | Type III as defined in [1] |
| T_PACKET_SIZE | 16 bits | Copied value from T_PACKET_SIZE field in the most recent successful Create/Update Request (Wave 0) for this FLOW ID |
| RESERVED | 8 bits | Type III as defined in [1] |
| INGRESS_NODE_ID | 8 bits | Node ID for the ingress of the PQoS Flow |
| RESERVED | 24 bits | Type III as defined in [1] |
| EGRESS_NODE_ID | 8 bits | Node ID for egress of unicast PQoS Flow or 0x3F is for a broadcast PQoS Flow; Multicast Channel ID for a multicast PQoS Flow |
| FLOW_TAG | 32 bits | Copied value from FLOW_TAG field in the most recent create/update Request (Wave 0) for this FLOW_ID |
| RESERVED | 16 bits | Type III as defined in [1] |
| PACKET_DA | 48 bits | DA of Ethernet packets of the PQoS Flow; For a Multicast PQoS Flow, the Multicast MAC Address of the flow |
| RESERVED | 8 bits | Type III as defined in [1] |
| T_PEAK_DATA_RATE | 24 bits | Copied value from T_PEAK_DATA_RATE field in the most recent create/update Request (Wave 0) for this FLOW_ID |
| T_LEASE_TIME | 32 bits | Copied value from T_LEASE_TIME field in the most recent create/update Request (Wave 0) for this Flow ID |
| T_BURST_SIZE | 8 bits | Copied value from T_BURST_SIZE field in the most recent successful Create/Update Request (Wave 0) for this Flow ID |
| RESERVED | 24 bits | Type III as defined in [1] |

FIGURE 21

Asynchronous Data / Link Control Reservation Request Element Format in MOCA 2.0

| Field | Length | Usage |
|---|---|---|
| FRAME_SUBTYPE | 4 bits | If FRAME_TYPE = Link Control (0x2)<br>0x0 – Type I/III Probe Report, 0x1 – Reserved Type II<br>0x2 – Reserved Type II, 0x3 – Key distribution<br>0x4 – Dynamic Key distribution, 0x5 – Type I/III Probe Report Request<br>0x6 – Link Acknowledgement, 0x7 – Reserved Type II<br>0x8 – Periodic Link Packet, 0x9 – Power Control<br>0xA – Power Control Response, 0xB – Power Control Acknowledgement, 0xC – Power Control Update, 0xD – Topology update, 0xE – Unicast MAC Address Notification<br>0xF – Reserved Type II, If FRAME_TYPE = Ethernet Transmission,<br>0x0 = ETHERNET_PACKET for A-PDU<br>0x1 = Opportunistic reservation request for A-PDU<br>If FRAME_TYPE = Link Control II (0x9)<br>0x3 – Rx-Determined Probe Request |
| FRAME_TYPE | 4 bits | 0x2 = Link Control, 0x3 = Ethernet Transmission<br>0x9 = Link Control II |
| DESTINATION | 8 bits | Node ID of the destination node for unicast and broadcast transmission; Multicast Channel ID for multicast transmission |
| PHY_PROFILE | 8 bits | Indicates the type of modulation scheme used for this transmission<br>bits 7:6<br>  00 = profile sequence 0, 01 = profile sequence 1<br>bits 5:0<br>  0x2 = Diversity Mode profile, 0x7 = Unicast profile<br>  0x8 = Broadcast profile, 0xD = Unicast profile in MoCA 2.0 PHY,<br>  0xE = Broadcast (BBL) profile in MoCA 2.0 PHY<br>  0x10 = Very Low PER Unicast profile in MoCA 2.0 PHY.<br>  0x11 = Very Low PER Broadcast profile in MoCA 2.0 PHY.<br>  0x12 = Unicast profile in channel bonding<br>  0x13 = Multicast profile<br>All other values reserved.<br>Bits 5:0 SHOULD be ignored if FRAME_TYPE = Control II (0x9) and FRAME_SUBTYPE = 0x3. |
| REQUEST_ID | 8 bits | A sequence number associated with the request. |
| FLOW_TAG1 | 4 bits | A unique identifier for a unicast PQoS flow between a transmitter and a receiver |
| PARAMETERS | 8 bits | If FRAME_TYPE = Ethernet Transmission and<br>FRAME_SUBTYPE = 0x0<br>  Bits 11:9 – Reserved<br>  Bits 8:0 –<br>    Total data size of the FEC padding bytes in the last symbol.<br>      Combined with the DURATION field, this field is used to calculate the total MPDU size which cannot exceed $S_a$ by NC.<br>If FRAME_TYPE = Ethernet Transmission and<br>FRAME_SUBTYPE = 0x1 and PRIORITY = 0x3<br>  Bits 11:7 – Reserved<br>  Bit 6 – Maximum aggregation flag<br>    0: the A-PDU has NOT reached either maximum aggregation size or maximum aggregation packet number<br>    1: the A-PDU has reached either maximum aggregation size or maximum aggregation packet number<br>  Bits 5:0 – The smallest Time to Live (TTL) value of PQoS packets in the A-PDU<br>Else<br>  Bits 11:0 -- Reserved. |
| PRIORITY | 4 bits | If FRAME_TYPE = Control<br>  0x0<br>If FRAME_TYPE = Ethernet Transmission<br>  0x0 – Low Priority<br>  0x1 – Medium Priority<br>  0x2 – High Priority<br>  0x3 – PQoS Priority<br>  0x4 – Higher Priority |
| DURATION | 16 bits | Transmission time required in multiples of SLOT_TIME |

FIGURE 22

Data Allocation Unit format

| Field | Length | Usage |
|---|---|---|
| FRAME_SUBTYPE | 4 bits | If FRAME_TYPE = MAP<br>   0x0 = MAP<br>If FRAME_TYPE = Reservation Request<br>   0x0 = Asynchronous<br>If FRAME_TYPE = Link Control<br>   0x0 – Type I/III Probe Report<br>   0x1 – Admission Request<br>   0x2 – Admission response<br>   0x3 – Key distribution<br>   0x4 – Dynamic Key distribution<br>   0x5 – Type I/III Probe Report Request<br>   0x6 – Link Acknowledgement<br>   0x7 – Type II Probe Report<br>   0x8 – Periodic Link Packet<br>   0x9 – Power Control<br>   0xA – Power Control Response<br>   0xB – Power Control Acknowledgement<br>   0xC – Power Control Update<br>   0xD – Topology update<br>   0xE – Unicast MAC Address Notification<br>   0xF – L2ME<br>If FRAME_TYPE = Ethernet transmission<br>   0x0 – Low Priority<br>   0x1 – Medium Priority<br>   0x2 – High Priority<br>   0x3 – PQoS Flow<br>   0x4 – Higher Priority<br>   0x5-0xE – reserved.<br>If FRAME_TYPE = MPEG or DSS<br>  Field is Reserved<br>If FRAME_TYPE = Link Control II<br>   0x0 – Pre-admission discovery request<br>   0x1 – Pre-admission discovery response<br>   0x2 – Probe transmission request in ACF Slot<br>   0x3 – Rx-Determined Probe Request<br>If FRAME_TYPE = Terminal allocation<br>   0x0 = Terminal allocation<br>If FRAME_TYPE = Beacon and REQUEST_ID = Beacon<br>   0x0 = Beacon<br>If FRAME_TYPE = Beacon and REQUEST_ID = ACF<br>   0x2 = Admission Response<br>If FRAME_TYPE = Beacon and REQUEST_ID = Additional ACF<br>   0x4 = MoCA 2.0 Admission Response in MoCA 2.0 PHY |
| FRAME_TYPE | 4 bits | Indicates the type of transmission for which the time is being allocated. Only following values are allowed.<br>0x0 = MAP<br>0x1 = Reservation request<br>0x2 = Link Control<br>0x3 = Ethernet transmission<br>0x4 = Reserved for future use |

FIGURE 23A

| | | |
|---|---|---|
| | | 0x5 = MPEG transmission<br>0x6 = DSS transmission<br>0x9 = Link Control II<br>0xA = Terminal allocation Unit (TAU)<br>0xC = Beacon |
| SRC | 8 bits | ID of source node for the transmission |
| DESTINATION | 8 bits | Node ID of destination node for Unicast and Broadcast transmission; Multicast Channel ID for Multicast transmission |
| PHY_PROFILE | 8 bits | Indicates the type of modulation scheme used for this transmission<br>bits 7:6<br>00 = profile sequence 0<br>01 = profile sequence 1<br>bits 5:0<br>0x1 = Beacon Mode profile<br>0x2 = Diversity Mode profile<br>0x6 = MAP profile<br>0x7 = Unicast profile<br>0x8 = Broadcast profile<br>0xC = MAP profile in MoCA 2.0 PHY<br>0xD = Unicast profile in MoCA 2.0 PHY<br>0xE = Broadcast (BBL) profile in MoCA 2.0 PHY<br>0xF = OFDMA profile in MoCA 2.0 PHY<br>0x10 = Very Low PER Unicast profile in MoCA 2.0 PHY<br>0x11 = Very Low PER Broadcast profile in MoCA 2.0 PHY<br>0x12 = Unicast profile in channel bonding<br>0x13 = Multicast profile<br>All other values reserved. |
| REQUEST_ID | 8 bits | If FRAME_TYPE != Beacon<br>Transaction or request ID of the transmission<br>If FRAME_TYPE = Beacon<br>0x0 = Beacon<br>0x1 = ACF<br>0x2 = Additional ACF |
| IFG_TYPE | 4 bits | IFG value between previous and current allocation unit. The IFG value are chosen by the following rules;<br>• MoCA 1.0 transmissions are always preceded and followed by MoCA 1.0 Default IFG (IFG_TYPE = 0x0)<br>• PAU transmissions are always preceded and followed by Long IFG (IFG_TYPE = 0x1) unless a TAU is scheduled immediately following the PAU, in which case the following IFG MAY be either a MoCA 1.0 Default IFG (0x0) or MoCA 2.0 IFG (0x3) as long as the total duration of the TAU and the following IFG is at least equal to the duration of Long IFG<br>• The IFG between two MoCA 2.0 transmissions is always MoCA 2.0 IFG (IFG_TYPE = 0x3)<br>• TAU do not need IFG (IFG_TYPE = 0x2) |
| OFFSET | 20 bits | Time from the VALID_FROM field of the MAP to the beginning of transmission of this packet (including PHY overheads) as a multiple of SLOT_TIME |

FIGURE 23B

*Request L2ME Frame of Wave 0 of Delete Multicast Channel Transactions*

| Field | Length | Usage |
|---|---|---|
| Response L2ME Header for Wave 0 of Delete Multicast Channel Transactions | | |
| HDR_FMT | 8 bits | 0xA |
| ENTRY_NODE_ID | 8 bits | The ID of the Entry node that submitted the transaction; 0xFF = no Entry node (i.e., the Transaction was initiated by the NC node). |
| ENTRY_INDEX | 8 bits | Copied from the initiating Submit message; 0 = no Entry node |
| WAVE_SEQ_N | 8 bits | An NC counter, which is held constant for all the L2ME Wave Cycles in an L2ME Wave, and is incremented when a new L2ME Wave starts. The NC node MUST increment this counter without resetting from the last L2ME Wave in an L2ME Transaction to the first L2ME Wave in the next L2ME Transaction in the network. |
| VENDOR_ID | 16 bits | Copied from initiating Submit or NC node specified if ENTRY_NODE_ID=0xFF |
| TRANS_TYPE | 8 bits | Copied from initiating Submit or NC node specified if ENTRY_NODE_ID=0xFF |
| TRANS_SUBTYPE | 8 bits | Copied from initiating Submit or NC node specified if ENTRY_NODE_ID=0xFF |
| WAVE_NODEMASK | 32 bits | If TXN_WAVE_N=0<br>  If there is an Entry node, copied from initiating Submit field WAVE0_NODEMASK; otherwise as desired by the NC<br>If (TXN_WAVE_N ≠ 0), see text immediately below this table |
| CYCLE_NODEMASK | 32 bits | The subset of WAVE_NODEMASK where the NC node requires a Response in this Wave Cycle |
| WAVE_STATUS | 8 bits | Bits 7:3 reserved<br>Bit 2: RESP_FAIL = 1 if response was not received from the requested node in previous Wave. This indicates that this is the last L2ME Wave due to transaction failure; otherwise = 0<br>Bit 1: 0x0 reserved<br>Bit 0: FINAL_SUCCESS = 1 if the NC node declares this Wave as the last Wave with no errors; otherwise = 0 |
| DIR_LEN | 8 bits | 0x10 - If L2ME_PAYLOAD field has payload type "Concatenated", otherwise 0x0. |
| TXN_SEQ_N | 8 bits | A transaction sequence number, which is held constant for all the L2ME Waves in an L2ME transaction, and is incremented by the NC node when a new L2ME transaction starts |
| TXN_WAVE_N | 8 bits | Wave number within the L2ME transaction, starting with 0 for initial Wave, and incremented by 1 for each subsequent Wave, except for the situation wherein the TXN_WAVE_N entry is set to TXN_LAST_WAVE_NUM. |
| Response L2ME payload for Wave 0 of Delete Multicast Channel Transactions (optional) | | |
| L2ME_PAYLOAD | Variable length | One of four different payload types |

FIGURE 24

METHOD AND APPARATUS FOR PERFORMING MULTICAST IN COMMUNICATIONS NETWORK

TECHNICAL FIELD

The disclosed method and apparatus relates to communications networks, and more specifically, to a method and apparatus for performing multicast transmissions over a communications network.

DESCRIPTION OF THE RELATED ART

Some communications network protocols, such as the well-known Multimedia over Coax Alliance (MoCA) 1.x standard protocol, promulgated by the MoCA (Multimedia over Coax Alliance) industry standards body, implement multicasting using broadcasting techniques, and provide no multicast group management. All of the multicast traffic is broadcast to all of the MoCA nodes on the MoCA network. Handling the multicast traffic in this way creates two major problems: (1) when creating a PQoS (Parameterized Quality of Service) transmission for packets that are directed to only some of the MoCA nodes (i.e., only some nodes want to receive packets), a low-performing node (i.e., a node with limited buffer and/or limited host or bridge bandwidth) can prevent the creation of such a transmission, even when that low performing node need not receive the transmission; and (2) a node may be flooded with non-PQoS multicast traffic that it does not want (because it does not belong to the multicast group and therefore the traffic is not intended for that node). This unwanted traffic can affect the reception of other more desired traffic by taking up buffer and host (or bridge) bandwidth.

Accordingly, there is a need for a way to provide traffic only to those nodes that desire to receive that traffic and relieve other nodes of having to handle traffic that is not of interest.

SUMMARY OF DISCLOSED METHOD AND APPARATUS

Various embodiments of the disclosed method and apparatus for performing multicasting are presented. In one embodiment, when one node has information to transmit to a group of nodes using a parameterized quality of service (PQoS) transmission (commonly referred to as a PQoS flow), a broadcast flow is created rather than creating a multicast flow, which is not available. It will be understood by those skilled in the art that the term "flow" is used throughout this disclosure to refer to a transmission of packets from a source node to one or more destination nodes over a network, wherein the destination nodes are the same for all of the packets of the flow.

While the flow is created as a broadcast flow, if the flow is to be directed to less than all of the nodes on the network, then the flow will be considered a Multicast PQoS flow. The broadcast flow is created using a process that is known as a "PQoS Create Flow" transaction. A FLOW_ID uniquely identifies each broadcast flow. The FLOW_ID is contained in a "Request Layer-2 Management Entity (L2ME) Frame" from a network controller (NC). The FLOW_ID is generated by a "MoCA Entry Node". The MoCA Entry Node initiates the PQoS Create Flow Transaction by sending the "Submit" message to the NC. Receiving nodes of the network that do not want to receive this flow respond to the reception of the flow by sending back over the network a "RESPONSE_CODE" value equal to "RESPONSE_CODE_UNINVOLVED". The RESPONSE_CODE is transmitted by the receiving node in a "Response L2ME Frame" of the PQoS Create Flow transaction process. Application software informs the MoCA layer if the receiving node will get involved in the flow. This application software runs in an application that is a part of a hierarchical layered software implementation being implemented by the MoCA node and that runs above the MoCA layer. Each MoCA node will actually receive all MoCA broadcast packets (including those that are part of a multicast flow). However, "egress filtering" will drop packets belonging to the multicast groups to which the receiving node does not wish to belong. Those packets are identified by a packet destination (e.g., "the PACKET_DA of the Ethernet frame"). For non-PQoS flows, a higher-layer application running within each node will configure that node's MoCA receiver with multicast Media Access Control (MAC) destination addresses. If any of the flows received are directed to one of these MAC destination addresses, that flow will be received, and all other flows will be dropped.

An alternative embodiment provides explicit multicast channel management within a network communication protocol, such as MoCA. In this embodiment, an Internet Group Management Protocol (IGMP) server within the MoCA network initiates a "MoCA Multicast Channel Management" process by invoking a "MoCA Entry" node. The MoCA Entry node is the MoCA node that starts the "MoCA Multicast Channel Management" process at MoCA level under the request of the IGMP server. The MoCA entry node may be the same as, or different from, the MoCA Multicast Ingress node. The MoCA Multicast Ingress node is the node from which the Multicast flow originates. For each IP multicast, only one MoCA multicast channel will be created.

The same L2ME protocol that is used for protocol management of the PQoS transactions is also used for Multicast Channel Management. The only difference is that in Multicast Channel Management for non-PQoS multicasting, there is no TSpec involved (no need to calculate the amount of resources required and the time to complete the flow). Therefore, there are also no corresponding resources involved (since there is no guarantee of delivery within a particular amount of time or at a particular rate, there is no need to allocate particular resources before setting up the flow). In both PQoS multicasting and non-PQoS multicasting, the Network Controller (NC) assigns a MoCA Multicast Channel ID to the multicast group, so that there is a one-to-one mapping between the "Multicast_MAC_DA" (i.e., the destination addresses for the nodes that belong to the multicast group) and the MoCA Multicast Channel ID assigned to a given multicast group. The MoCA Multicast Channel ID is used in both Reservation Requests (RR) and Media Access Plans (MAPs) so that a receiver can use it to prepare for packet reception.

During the PQoS Create Flow transaction, nodes that do not belong to the Multicast Channel ID will report that they are not involved in the flow by sending back over the network a "RESPONSE_CODE" value equal to "RESPONSE_CODE_UNINVOLVED". The RESPONSE_CODE is transmitted by the receiving node in a "Response L2ME Frame" of the PQoS Create Flow transaction process. Thus, an uninvolved node will never block the creation of the PQoS flow. For all multicast traffic (PQoS and non-PQoS), a receiver that does not belong to a multicast channel will not receive any such multicast traffic. While this method and the associated apparatus support true multicasting over a network protocol such as MoCA in terms of multicast channel management, in one embodiment, broadcast bit-loading is used for simplicity.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 2 is a table showing the format of the Submit L2ME frame.

FIG. 3 is a table showing the format of a Request L2ME Frame.

FIG. 4 is a table showing the format of an L2ME_PAYLOAD for a Response L2ME Frame used in a Create/Update Multicast Channel Transactions (Wave 0).

FIG. 5 is a List of RESPONSE_CODE values.

FIG. 6 is a table showing the format of an L2ME_PAYLOAD for a Request L2ME Frame used in a Create and Update Multicast Channel Transaction (Wave 1).

FIG. 7 is a list of acceptable decision values.

FIG. 8 is a table showing the format of an L2ME_PAYLOAD for a Submit L2ME Frame for a Delete Multicast Channel Transaction.

FIG. 9 is a table showing the format for a Response L2ME Frame used in a Delete Multicast Channel Transaction (Wave 1).

FIG. 10 is a table showing the format of a Response L2ME Frame Format for a Delete PQoS Flow Transaction (Wave 2).

FIG. 11 is a table showing the format of an L2ME_PAYLOAD of a Submit L2ME Frame used in a Query Multicast Channel Transaction.

FIG. 12 is a table showing the format of a Response L2ME Frame format for a Query Multicast Channel Transaction (Wave 0), if the Multicast Channel is found.

FIG. 13 is a table showing the format of an L2ME_PAYLOAD Field for a Submit L2ME Frame used in a Create and Update PQoS Flow Transaction.

FIG. 15 is a table showing the format of an L2ME_PAYLOAD for Response L2ME Frame for a Create PQoS Flow and Update Flow Transaction (Wave 0).

FIG. 16 is a list of RESPONSE_CODE values.

FIG. 17 is a table showing the format of an L2ME_PAYLOAD of Request L2ME Frame for a Create and Update PQoS Flow Transaction (Wave 1).

FIG. 18 is a list of acceptable decision values.

FIG. 19 is a list of Non-bandwidth-related RESPONSE CODEs and corresponding DECISION values.

FIG. 20 is a table showing the format of an L2ME_PAYLOAD of a Submit L2ME Frame Format for a Query PQoS Flow Transaction.

FIG. 21 is a table of a Response L2ME Frame format for a Query PQoS Flow Transaction (Wave 0) if the Flow is found.

FIG. 22 is table of the Asynchronous Data/Link Control Reservation Request Element Format in MOCA 2.0.

FIGS. 23A and 23B are a table of the DAU format.

FIG. 24 is a table of the format of a Request L2ME Frame of Wave 0 of Delete Multicast Channel Transactions.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

A method and apparatus is disclosed to be used in networks that previously have no facility for multicast management.

I. Method 1: Egress Filtering

In one embodiment of the disclosed method and apparatus, for Parameterized Quality of Service (PQoS) flows, a broadcast flow is created for a multicast flow, using a "PQoS Create Flow" transaction. The Multimedia over Coax Alliance (MoCA) nodes that do not want to receive this flow respond with a RESPONSE_CODE value of "RESPONSE_CODE-_UNINVOLVED" in a "Response Layer-2 Maintenance Entry (L2ME) Frame" of Wave 0 of a Create and Update PQoS Flow Transaction. An application above a MoCA layer of a MoCA node informs the MoCA layer if it gets involved in a multicast flow. A Multicast PQoS flow is identified by the FLOW_ID. The FLOW_ID is contained in the a "Request L2ME Frame" in Wave 0 from a Network Controller (NC) based on an initial "Submit" message.

A MoCA bridge may be pre-configured to get involved in some multicast flows as indicated with FLOW_ID, or is designed to do Internet Group Management Protocol (IGMP) snooping to learn dynamically if it gets involved in a broadcast PQoS flow.

Each MoCA node will actually receive all MoCA broadcast packets, and egress filtering will drop packets belonging to the multicast groups (as indicated by the destination address, PACKET_DA, of the Ethernet frame) that the MoCA node does not want. Some clarification in the MoCA spec is needed to clearly allow a node abstain from a broadcast PQoS flow through the RESPONSE_CODE value RESPONSE_CODE_UNINVOLVED.

For non-PQoS flows, higher-layer of each node will configure its MoCA receiver with multicast Media Access Control (MAC) addresses to be received, and drop all others.

A major drawback of this method is that some high-layer information (like IGMP entity or provisioning) is needed in order for the MoCA layer to do the egress filtering for multicast traffic, and in order to prevent a low-performance node from blocking the creation of a multicast PQoS flow, a flow that the low-performance node may actually need to receive.

II. Method 2: Multicast Channel Management over MoCA

This method provides explicit multicast channel management within MoCA, as described below. It will be understood by those skilled in the art that this method may be used with network architectures other than MoCA, but that MoCA is used as an example.

Figure 1:
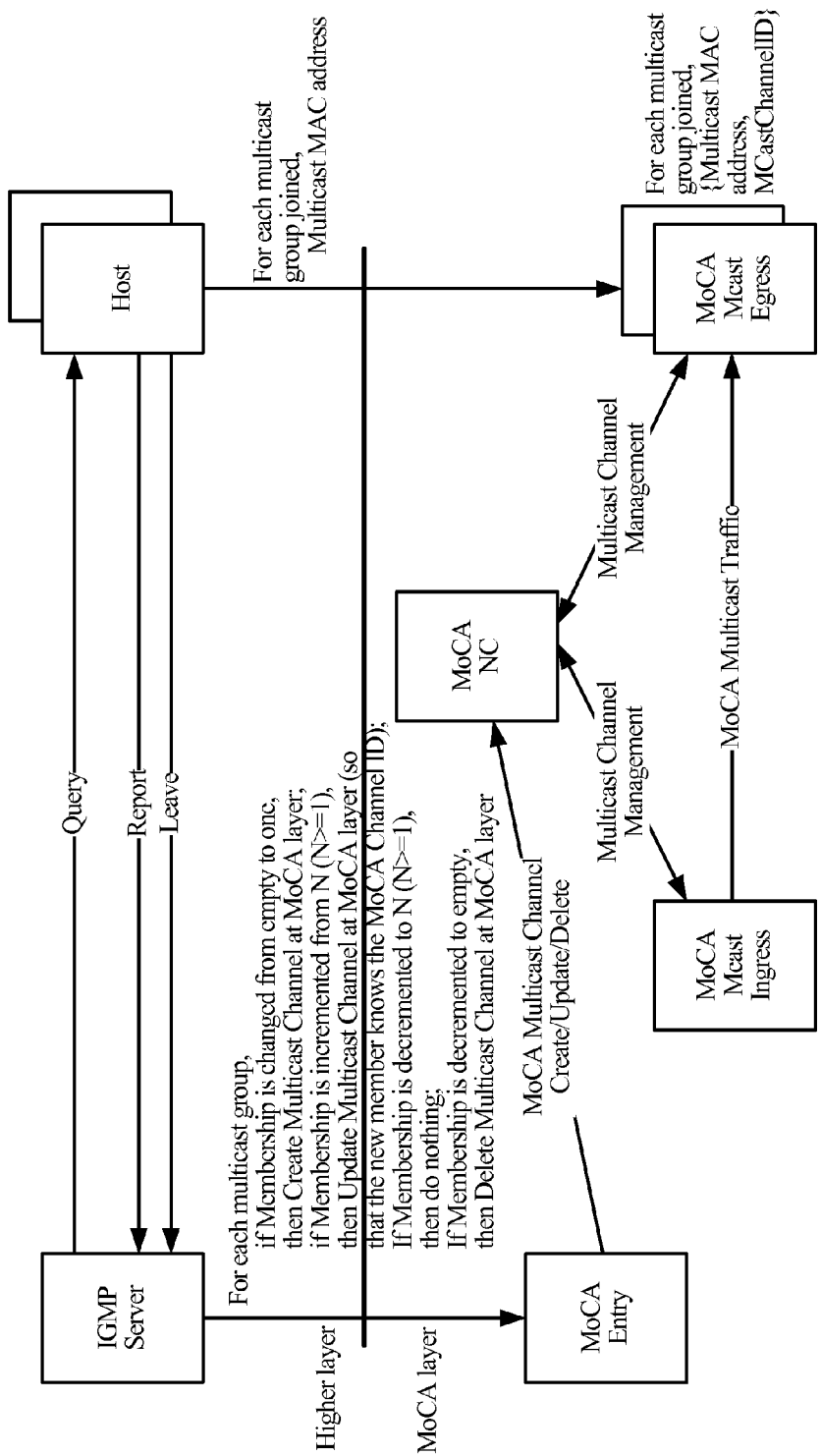
FIG. 1 illustrates the interaction between higher layer and MoCA layer for multicast management for non-Parameterized QoS traffic.

For Non-Parameterized QoS traffic, the process is defined below. FIG. 1 illustrates the interaction between higher layer and MoCA layer for multicast management for non-Parameterized QoS traffic.

The IGMP server initiates the MoCA Multicast Channel Management process by invoking the MoCA Entry node. The MoCA entry node may be the same or different from MoCA multicast ingress node. For each IP multicast, only one MoCA multicast channel will be created.

The management protocol used for Multicast Channel Management uses that same L2ME protocol used for PQoS transactions. The only difference is that for non-PQoS multicasting, there is no "TSpec" as that term is defined by the MoCA 1.0 specification and thus corresponding resources involved. In both PQoS multicasting and non-PQoS multicasting, the Network Controller (NC) assigns a MoCA Multicast Channel ID to the multicast group, so that there is a one-to-one mapping between the multicast media access control destination address (Multicast_MAC_DA) and the multicast channel identification value (Multicast_Channel_ID) for a given multicasting. The Multicast_Channel_ID is used in both reservation request (RR) and Media Access Plan (MAP) Data Allocation Unit (DAU) so that a receiver can use it to prepare for packet reception.

III. Multicast Channel Management Transactions a) Multicast Channel Create and Update Transaction i) Submit L2ME Frame for Multicast Channel Create and Update Transaction To begin the creation of a multicast channel in the MoCA Network, the Entry Node transmits a Submit L2ME frame to the NC. FIG. 2 is a table showing the format of the Submit L2ME frame. The following additional constraints are observed on various fields of the Submit L2ME Frame.

```
VENDOR_ID = 0x0 (MoCA)
TRANS_TYPE = 0x1 (QoS)
TRANS_SUBTYPE = 0xA (Multicast Channel Create) or 0xB
(Multicast Channel Update)
  WAVE0_NODEMASK = Set to indicate all L2ME-capable nodes
in the MoCA Network
  MSG_PRIORITY = 0xF0
  TXN_LAST_WAVE_NUM = 1
  L2ME_PAYLOAD = as shown in FIGURE 2
``` b) Wave 0 of Multicast Channel Create/Update Transactions i) Request L2ME Frame of Wave 0 of Multicast Channel Create/Update Transactions The NC node initiates Wave 0 using a Request L2ME Frame, the format of which is shown in FIG. 3 and based on the Submit shown in the table of FIG. 2.

ii) Response L2ME Frame of Wave 0 of Create and Update Multicast Channel Transactions In Wave 0, each node responds to the NC node with an L2ME Response Frame. The Response L2ME Frame for Multicast Channel Create/Update Transaction follows the format shown in FIG. 4. The following additional constraints are observed.

```
RESP_STATUS = Bit 0 set to '1'
L2ME_PAYLOAD = as defined in FIGURE 4.
```

Each requested node issues a RESPONSE_CODE where the list of acceptable values is shown in FIG. 5. If a node selects multiple RESPONSE_CODEs for rejection of a Create/Update Multicast Channel request, the decision regarding which RESPONSE_CODE value to include from among all selected RESPONSE_CODEs in the WAVE 0 L2ME Response message is the numerically highest RESPONSE_CODE.

If the ingress node is able to fulfill the NC node request, it issues a Response Code 0x1 and provide MCAST_CHANNEL_ID.

c) Wave 1 of Create and Update Multicast Channel Transactions

In Wave 1, the NC node informs the nodes about the decision on the Multicast Channel Creation or Update request.

Before the NC node can send the Request L2ME Frame of Wave 1, it needs to determine the outcome of the Create or Update Multicast Channel transaction and values of other fields of the Request message. This section describes how the NC calculates these values and make the decision to either allow or reject the Create or Update request.

i) Request L2ME Frame of Wave 1 of Create and Update Multicast Channel Transaction The NC node sends the Request L2ME Frame for Wave 1. The following additional constraints are observed on various fields.

```
VENDOR_ID = 0x0 (MoCA)
TRANS_TYPE = 0x1 (QoS)
TRANS_SUBTYPE = OxA (Create Multicast Channel) 0xB (Update
Multicast Channel)
  WAVE_STATUS = 0
  DIR_LEN = 0x00
  TXN_WAVE_N = 0x1
  L2ME_PAYLOAD = as shown in FIGURE 6.
```

The DECISION field provides the outcome, as determined by the NC, of the Create or Update Multicast Channel request from the Entry node. FIG. 7 shows meanings for all possible values of this field defined in this MoCA specification.

If an Update Multicast Channel operation failed, the existing multicast channel traffic still persists.

From the allowed RESPONSE_CODE values shown in FIG. 5, if the ingress node or an egress node returns RESPONSE_CODE_TOO_MANY_MCAST_CHANNELS, then the Request L2ME Frame for Wave 1 contains the DECISION_TOO_MANY_MCAST_CHANNELS.

ii) Response L2ME Frame for Wave 1 of Create and Update Multicast Channel Transactions Upon receiving a Request L2ME Frame indicating a successful Create or Update Multicast Channel operation in Wave 1, the ingress and egress nodes for the Multicast Channel commits the requested resources. Each node responds with a Response L2ME Frame with format shown in FIG. 4. Following additional restrictions are observed on various fields.

```
RESP_STATUS: Bit 0 - set to '1'
L2ME_PAYLOAD = 32 bit reserved.
``` d) Wave 2 of Create and Update Multicast Channel Transactions

Wave 2 informs the Entry node and other interested nodes that the requested transaction was completed.

i) Request L2ME Frame of Wave 2 of Create and Update Multicast Channel Transaction The NC node initiates Wave 2 using a Request L2ME Frame format using the format shown in FIG. 4. The following additional restrictions are observed for various fields.

```
VENDOR_ID = 0x0 (MoCA)
TRANS_TYPE = 0x1 (QoS)
TRANS_SUBTYPE = 0xA (Create Multicast Channel Create) 0xB
(Update Multicast Update Channel)
  DIR_LEN = 0x10
  TXN_WAVE_N = 0x2
  L2ME_PAYLOAD = of type "concatenated" with the
concatenated responses from Wave 1.
``` ii) Response L2ME Frame of Wave 2 of Create and Update Multicast Channel Transaction The Create/Update Multicast Channel Transaction is completed when the nodes provide their final Response L2ME Frame using the format shown in FIG. 4. The following additional restrictions are observed on various fields.

---
RESP_STATUS = "don't care". This field is reserved Type II.
L2ME_PAYLOAD = 32 bit reserved.
--- e) Delete Multicast Channel Transaction
i) Submit L2ME Frame for Delete Multicast Channel Transaction Any node can request to delete any Multicast Channel. The transaction starts when the Entry node sends a Submit L2ME Frame to the NC node. The following additional constraints are observed on various fields.

---
VENDOR_ID = 0x0 (MoCA)
TRANS_TYPE = 0x1 (QoS)
TRANS_SUBTYPE = 0xC ("Delete Multicast Channel")
WAVE0_NODEMASK = includes all L2ME-capable nodes
MSG_PRIORITY = 0xF0
TXN_LAST_WAVE_NUM = 2
L2ME_PAYLOAD = as shown in the table of FIGURE 8.
--- f) Wave 0 of Delete Multicast Channel Transaction
Wave 0 informs all L2ME-capable nodes of the Multicast Channel to be deleted.
i) Request L2ME Frame of Wave 0 of Delete Multicast Channel Transaction The NC node initiates Wave 0 using a Request Frame for which the format is shown in FIG. 24 based on the Submit L2ME Frame for Delete Multicast Channel Transaction.

ii) Response L2ME Frame of Wave 0 of Delete Multicast Channel Transaction

Each node responds with a Response L2ME Frame formatted as shown in FIG. 4, indicating if it has the resources requested to be deleted. The following additional constraints are observed on various fields.

---
RESP_STATUS: Bit 2 = set to '1' if the node has resources to be deleted for the requested PQoS Flow
RESP_STATUS: Bit 0 = '1'
L2ME_PAYLOAD =32 bit reserved
--- g) Wave 1 of Delete Multicast Channel Transaction
During Wave 1 the Multicast Channel resources are deleted.
i) Request L2ME Frame of Wave 1 of Delete Multicast Channel Transaction The NC node initiates Wave 1 using a Request L2ME Frame format with the concatenated responses from Wave 0.

ii) Response L2ME Frame of Wave 1 of Delete Multicast Channel Transaction

Each node included in Wave 1 responds with a Response L2ME Frame in Wave 1, formatted as shown in FIG. 4. The following additional constraints are observed.

---
RESP_STATUS: Bit 0 = '1'
L2ME_PAYLOAD = as shown in FIGURE 9.
--- h) Wave 2 of Delete Multicast Channel Transaction
In Wave 2, the NC node informs the nodes participating in Wave 2 of each node's response to the deletion request.

i) Request L2ME Frame of Wave 2 of Delete Multicast Channel Transaction

The NC node initiates Wave 2 using a Request L2ME Frame format with the concatenated responses from Wave 1.

ii) Response L2ME Frame of Wave 2 of Delete Multicast Channel Transaction

The Delete Multicast Channel transaction is completed when the Entry node and any other requested nodes provide their final Response L2ME Frame formatted as shown in FIG. 4. The following additional restrictions are observed on various fields ---
RESP_STATUS = ignored by receiving nodes
L2ME_PAYLOAD = as shown in table of FIGURE 10
--- i) Query Multicast Channel Transaction
The purpose of the Query Multicast Channel Transaction is to retrieve the attributes of a specific Multicast Channel. One usage is to allow a MoCA node to find out the MoCA Channel ID associated to a Multicast MAC Address.

i) Submit L2ME Frame for Query Multicast Channel Transaction

Any node can query any Multicast Channel. The Query Multicast Channel Transaction starts when the Entry node sends a Submit L2ME Frame to the NC node. The following additional constraints are observed on various fields.

---
VENDOR_ID = 0x0 (MoCA)
TRANS_TYPE = 0x1 (QoS)
TRANS_SUBTYPE = 0xD ("Query Multicast Channel")
WAVE0_NODEMASK = nodes queried
MSG_PRIORITY = 0x80
TXN_LAST_WAVE_NUM = 0x1
L2ME_PAYLOAD = as shown in the table of FIGURE 11.
--- j) Wave 0 of Query Multicast Channel Transaction
Wave 0 informs the nodes which Multicast Channel is being queried.
i) Request L2ME Frame of Wave 0 of Query Multicast Channel Transaction The NC node initiates Wave 0 using an L2ME Request Frame format based on the L2ME Submit message shown in FIG. 11 to the nodes to identify the nodes that hold the specific Multicast Channel.

ii) Response L2ME Frame of Wave 0 of Query Multicast Channel Transaction

Every node which is included in WAVE0_NODEMASK responds with a Response L2ME Frame. The following additional restrictions are observed on various fields.

---
RESP_STATUS: Bit 0 = '1'
L2ME_PAYLOAD = if node is the ingress node for the Multicast Channel, essentially as shown in FIGURE 4, and otherwise zero length payload.
--- k) Wave 1 of Query Multicast Channel Transaction
In Wave 1, the query results are transmitted to the Entry node and other nodes interested in the results.
i) Request L2ME Frame of Wave 1 of Query Multicast Channel Transaction The NC node initiates Wave 1 using a Request L2ME Frame format with the concatenated Response L2ME Frames from Wave 0.

ii) Response L2ME Frame of Wave 1 of Query Multicast Channel Transaction

The Query Multicast Channel transaction is completed when the interested nodes send their final Response L2ME Frame. The following additional restrictions are observed on various fields.

```
RESP_STATUS = ignored by receiving nodes
L2ME_PAYLOAD = reserved
``` l) Multicast PQoS Flow Transactions

For Parameterized QoS multicast flows, the process is identical to MoCA 1.1 PQoS transactions, except that:
1. in Wave 0 of the PQoS Create/Update Flow Transaction, the L2ME Request frame contains a new field "Multicast_Channel_ID" which is the Multicast Channel ID assigned by the NC;
2. Decision_codes related to the Multicast_Channel_ID for each node.

Figure 14:
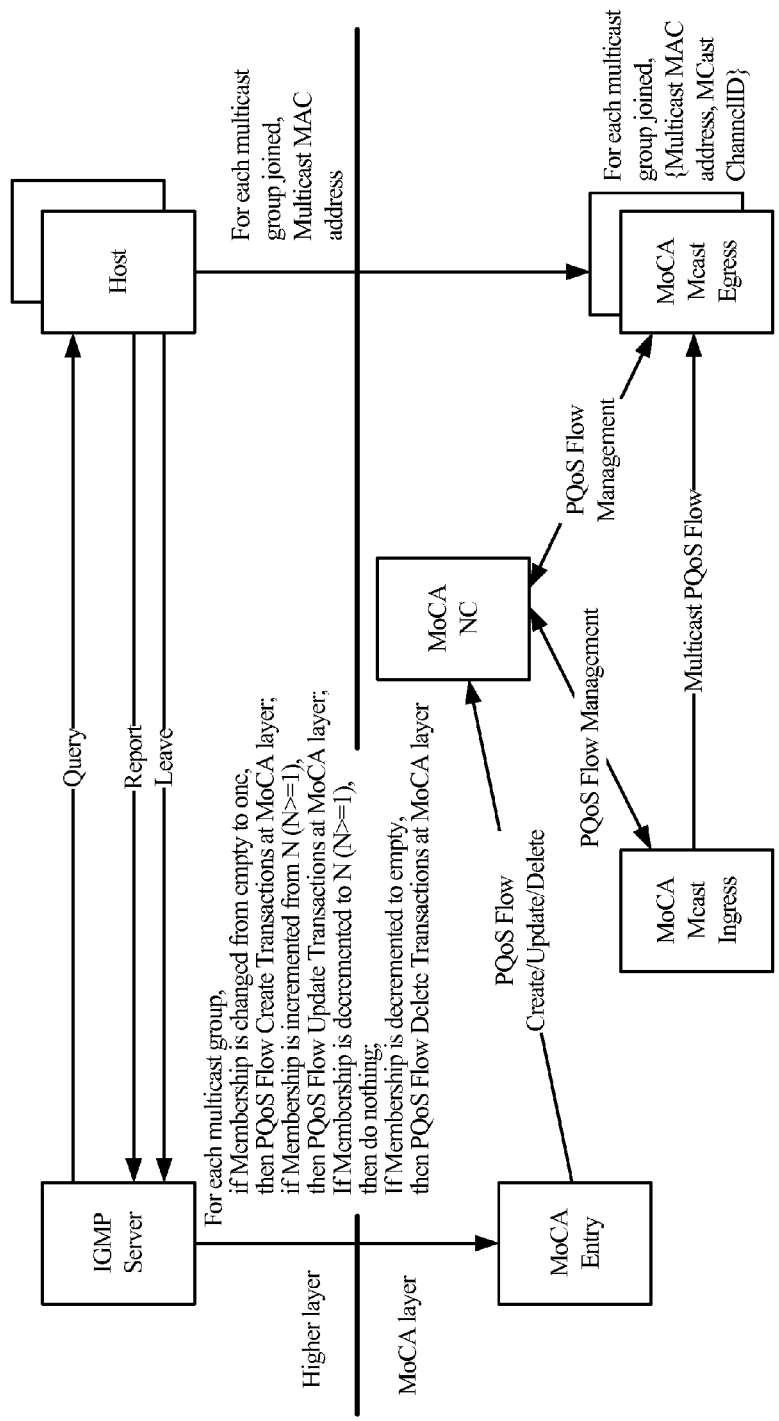
FIG. 14 is a block diagram showing the interaction between a higher layer and a MoCA layer for multicast management for Parameterized QoS traffic.

FIG. 14 is a block diagram showing the interaction between a higher layer and a MoCA layer for multicast management for Parameterized QoS traffic. In all PQoS flow transactions, the EGRESS_NODE_ID field in the payload are changed into the following:

```
EGRESS_NODE_ID   8 bits   Node ID of the egress node of a
                          Point-to-Point PQoS Flow;
                          0x3F for a Broadcast PQoS Flow;
                          Reserved for Create PQoS Flow,
                          otherwise the Multicast Channel ID for
                          multicast PQoS flow
```

During the PQoS Flow Create transaction, nodes that do not belong to the Multicast Channel ID will reports that they are not involved in the flow, thus will never block the creation of the PQoS flow.

m) Create and Update Multicast PQoS Flow Transactions
  i) Submit L2ME Frame for Create and Update Multicast PQoS Flow Transaction To begin the creation or update of a Multicast PQoS Flow in the MoCA Network, the Entry Node transmits a Submit L2ME frame (format shown in FIG. 24) to the NC. The following additional constraints are observed on various field of the Submit L2ME Frame.

```
VENDOR_ID = 0x0 (MoCA)
TRANS_TYPE = 0x1 (QoS)
TRANS_SUBTYPE = 0x1 (Create PQoS Flow) 0x2 (Update PQoS
Flow) (including Multicast now)
WAVE0_NODEMASK = Set to indicate all L2ME-capable nodes
in the MoCA Network
MSG_PRIORITY = 0xF0
TXN_LAST_WAVE_NUM = 2
L2ME_PAYLOAD = as shown in FIGURE 13
```

Note that at the PQoS flow create time, the Entry node differentiates a multicast PQoS flow from the unicast and broadcast PQoS flow by the setting the field EGRESS_NODE_ID to 0x00. FLOW_TAG1 MAY be used in the RR by the transmitter and by the nodes involved in the PQoS flow (including the transmitter, the receiver and the NC) to do per-flow-based management. Between one MoCA ingress node and one MoCA egress node, there can be more than one unicast PQoS flows using unicast Packet_DA. The use of FLOW_TAG1 allows distinguishing these flows.

n) Wave 0 of Create and Update PQoS Flow Transactions
  i) Request L2ME Frame of Wave 0 of Create and Update PQoS Flow Transactions The NC node initiates Wave 0 using a Request L2ME Frame with the format shown in FIG. 24 and based on the Submit shown in the table of FIG. 3.

ii) Response L2ME Frame of Wave 0 of Create and Update PQoS Flow Transactions FIG. 15 is a table showing the format of an L2ME_PAYLOAD for Response L2ME Frame for a Create PQoS Flow and Update Flow Transaction (Wave 0).

FIG. 16 is a list of RESPONSE_CODE values.

o) Wave 1 of Create and Update PQoS Flow Transactions
  i) Request L2ME Frame of Wave 1 of Create and Update PQoS Flow Transaction

```
VENDOR_ID = 0x0 (MoCA)
TRANS_TYPE = 0x1 (QoS)
TRANS_SUBTYPE = 0x1 (Create PQoS Flow) 0x2 (Update
PQoS Flow) (including Multicast now)
WAVE_STATUS = 0
DIR_LEN = 0x00
TXN_WAVE_N = 0x1
L2ME_PAYLOAD = as shown in FIGURE 17.
```

From the allowed RESPONSE_CODE values shown in FIG. 16, if any node returns one of the RESPONSE_CODEs listed in the first column of FIG. 19, then the Request L2ME Frame for Wave 1 contains the corresponding DECISION shown in FIG. 18. If nodes return more than one RESPONSE_CODE values shown in FIG. 16, then the NC may choose a DECISION value shown in FIG. 19 corresponding to any of the returned RESPONSE_CODE values.

ii) Response L2ME Frame for Wave 1 of Create and Update PQoS Flow Transactions
p) Wave 2 of Create and Update PQoS Flow Transactions
  i) Request L2ME Frame of Wave 2 of Create and Update PQoS Flow Transaction
q) Query PQoS Flow Transaction (including multicast PQoS flow)

The purpose of the PQoS Query PQoS Flow Transaction is to retrieve the attributes of a specific Flow ID.
  i) Submit L2ME Frame for Query PQoS Flow Transaction Any node can query any PQoS Flow. The Query PQoS Flow Transaction starts when the Entry node sends a Submit L2ME Frame to the NC node. The following additional constraints are observed on various fields.

```
VENDOR_ID = 0x0 (MoCA)
TRANS_TYPE = 0x1 (QoS)
TRANS_SUBTYPE = 0x5 ("Query PQoS Flow")
WAVE0_NODEMASK = nodes queried
MSG_PRIORITY = 0x80
TXN_LAST_WAVE_NUM = 0x1
L2ME_PAYLOAD = as shown in FIGURE 20
``` r) Wave 0 of Query PQoS Flow Transaction

Wave 0 informs the nodes which PQoS Flow is being queried.
  i) Request L2ME Frame of Wave 0 of Query PQoS Flow Transaction The NC node initiates Wave 0 using an L2ME Request Frame format based on the L2ME Submit message shown in FIG. 20 to the nodes to identify the nodes that hold the specific PQoS Flow.
  ii) Response L2ME Frame of Wave 0 of Query PQoS Flow Transaction Every node which is included in WAVED_NODEMASK responds with a Response L2ME Frame. The following additional restrictions are observed on various fields.

RESP_STATUS: Bit 0 = '1'
L2ME_PAYLOAD = if node is the ingress node for the PQoS Flow, as shown in FIGURE 21, otherwise zero length payload.

s) Wave 1 of Query PQoS Flow Transaction

In Wave 1, the query results are transmitted to the Entry node and other nodes interested in the results.

i) Request L2ME Frame of Wave 1 of Query PQoS Flow Transaction

The NC node initiates Wave 1 using a Request L2ME Frame format with the concatenated Response L2ME Frames from Wave 0.

ii) Response L2ME Frame of Wave 1 of Query PQoS Flow Transaction

The Query PQoS Flow transaction is completed when the interested nodes send their final Response L2ME Frame. The following additional restrictions are observed on various fields.

RESP_STATUS = ignored by receiving nodes
L2ME_PAYLOAD = RESERVED t) Multicast Membership and PQoS Flow Create and Update Due to the dynamic nature of multicast membership, the MoCA egress nodes of a multicast flow may change over time. The high layer of the MoCA ingress node will starts the PQoS Flow Create transaction for a multicast flow, if there is at least one receiver for this channel (as determined through IGMP). A PQoS Flow Create transaction may succeed or fail depending on the current egress nodes of the multicast flow. After a multicast flow has been created and running, if another node has joined the multicast group at high-layer through protocols like IGMP, the MoCA ingress node needs to invoke the PQoS Flow Update transaction so that MoCA layer resources are also set up for this new receiver. Update Flow transaction still uses the same EGRESS NODE ID which is the Multicast Channel ID as in the initial Create Flow transaction, with the difference being that the Multicast Channel ID has a new member (a new egress node), besides the existing members.

All multicast traffic is sent using broadcast bitloading. This is to simplify the bitloading calculation and probing involved, and the storage needed.

u) Multicast Membership and Non-PQoS Multicast traffic

For non-PQoS (i.e. prioritized) multicast traffic, IGMP protocol entity on a MoCA receiver will instruct the MoCA layer to receive only the traffic of multicast channels to which the receiver belong, and ignore all others. This pre-filtering is possible because the multicast channel IDs are carried in the DAU of the MAP.

Conclusion

In Method 2, during the PQoS Flow Create transaction, nodes that do not belong to the Multicast Channel ID will reports that they are not involved in the flow, thus will never block the creation of the PQoS flow. For all multicast traffic (PQoS and non-PQoS), a receiver that does not belong to a multicast channel will not receive them.

Method 2 needs some spec changes in the MoCA 2.0 spec, and supports true multicasting over MoCA in terms of multicast channel management, although broadcasting bit-loading is used for simplicity.

IV. Reservation Request Element Format

FIG. 22 is a table of the Asynchronous Data/Link Control Reservation Request Element Format in MOCA 2.0.

V. MAP Data Allocation Unit Format (DAU)

The MAP DAU indicates a multicast transmission of an Ethernet packet by specifying the following parameters:

✓ FRAME_TYPE = Ethernet transmission
✓ FRAME_SUBTYPE = priority of the packet
✓ DESTINATION = Multicast Channel ID for multicast
✓ PHY_PROFILE = 0x13 (multicast profile)
✓ FLOW_TAG1 = unique identifier for a PQoS flow from a given ingress node FIGS. 23A and 23B are a table of the DAU format. Note that because the 8-bit field of DESTINATION is used to define both the Node ID of the destination node (unicast or broadcast), and the Multicast channel ID (multicast), a specific value of PHY_PROFILE is used to differentiate a multicast transmission from a unicast transmission and a broadcast transmission. In this spec, the multicast profile uses the broadcast bitloading for simplicity.

VI. Co-existence between the Managed Multicasting and Legacy Multicasting

The multicasting management protocol described in this spec assumes that some higher-layer entity like IGMP server/Proxy invokes the MoCA layer. For a given MoCA node, its applications may send multicast packets to its ECL without first or ever invoking the MoCA multicasting management process. The transmitter will transmit these packets as broadcast packets as in MoCA 1.x. This legacy multicasting and the managed multicasting, as described in this spec, can coexist without any compatibility issue.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein do not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances are not meant to be read to imply that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for performing multicast channel management within a network communication protocol, comprising:
    identifying a first subset of a plurality of network nodes to which a multicast communication is to be directed;
    assigning a multicast channel ID to a multicast group to generate a one-to-one mapping between the multicast channel ID and destination addresses for the nodes that belong to the multicast group; and
    sending a broadcast communication to all network nodes in a broadcast flow, wherein said first subset of network nodes can determine from said multicast channel ID whether to receive said broadcast flow,
    wherein a second subset of said plurality of network nodes that does not want to receive said multicast traffic message perform the steps comprising:
    recognizing a multicast channel ID as belonging to a multicast communication that said second subset of network nodes does not wish to receive, and
    filtering out said multicast communication from said broadcast flow.

2. The method of claim 1, wherein said filtering is performed by egress filtering.

3. The method of claim 1, wherein said recognizing a multicast channel ID as belonging to a multicast communication that said second subset of network nodes does not wish to receive comprises: configuring said second subset of network nodes to receive packets for non-PQoS flows; and rejecting all other flows.

4. A computer program product, comprising a non-transitory medium having a computer readable program code embodied therein, said computer readable program code performing a method for managing a multicast communication among a plurality of network nodes when executed by a computer, said network nodes being arranged in a Multimedia over Coax Alliance (MoCA) protocol layer and a higher protocol layer, said method comprising:
    informing the MoCA layer, from the higher protocol layer, whether a receiving node in which the computer readable program is being executed will get involved in the multicast communication based on a MoCA address associated with the multicast communication;
    sending all broadcast packets to each network node of the plurality of network nodes;
    filtering out broadcast packets belonging to a multicast group to which the receiving node does not wish to belong at the MoCA layer.

5. The computer program product of claim 4, wherein said sending all broadcast packets to each network node comprises sending parameterized quality of service (PQoS) communications.

6. The computer program product of claim 4, wherein said sending all broadcast packets to each network node comprises sending non-parameterized quality of service (non-PQoS) communications.

7. The computer program product of claim 6, further comprising configuring a receiver of each network node with multicast media access control (MAC) destination addresses, wherein if any communication is received that is are directed to one of the MAC destination addresses, that communication will be received, and all other communications will be dropped at the MoCA layer.

* * * * *